Oct. 26, 1954  J. R. CLIFTON  2,692,662
EMERGENCY BRAKE SYSTEM FOR AIRCRAFT
Filed Nov. 19, 1949  2 Sheets-Sheet 1

INVENTOR:
JOHN R. CLIFTON
BY Hubert E. Metcalf
ATTORNEY

Oct. 26, 1954        J. R. CLIFTON        2,692,662
EMERGENCY BRAKE SYSTEM FOR AIRCRAFT
Filed Nov. 19, 1949        2 Sheets-Sheet 2
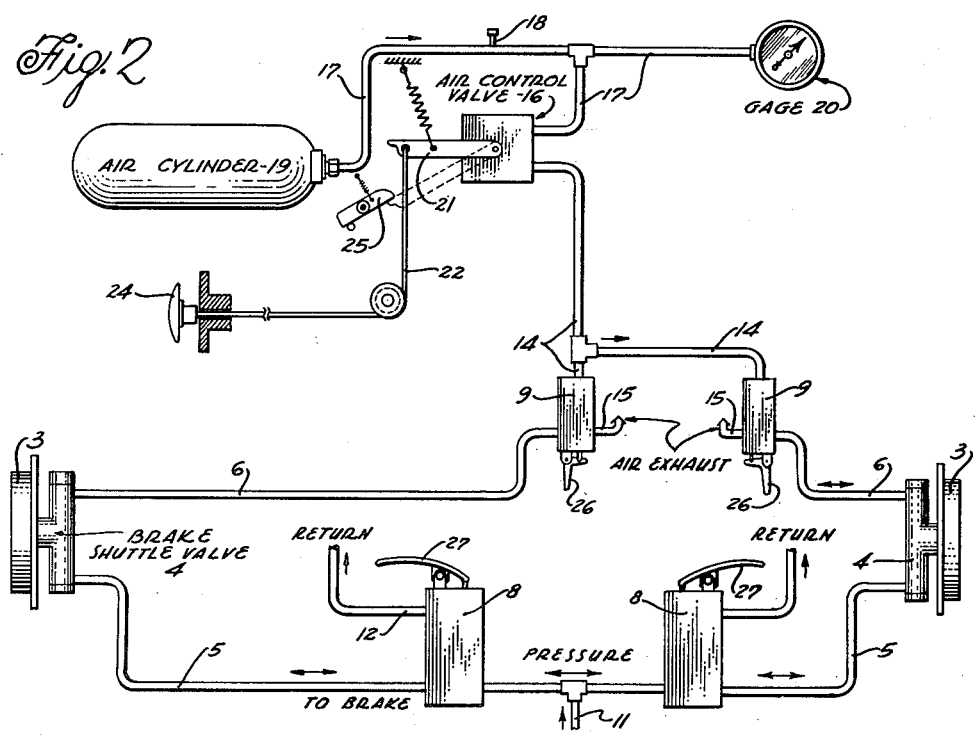
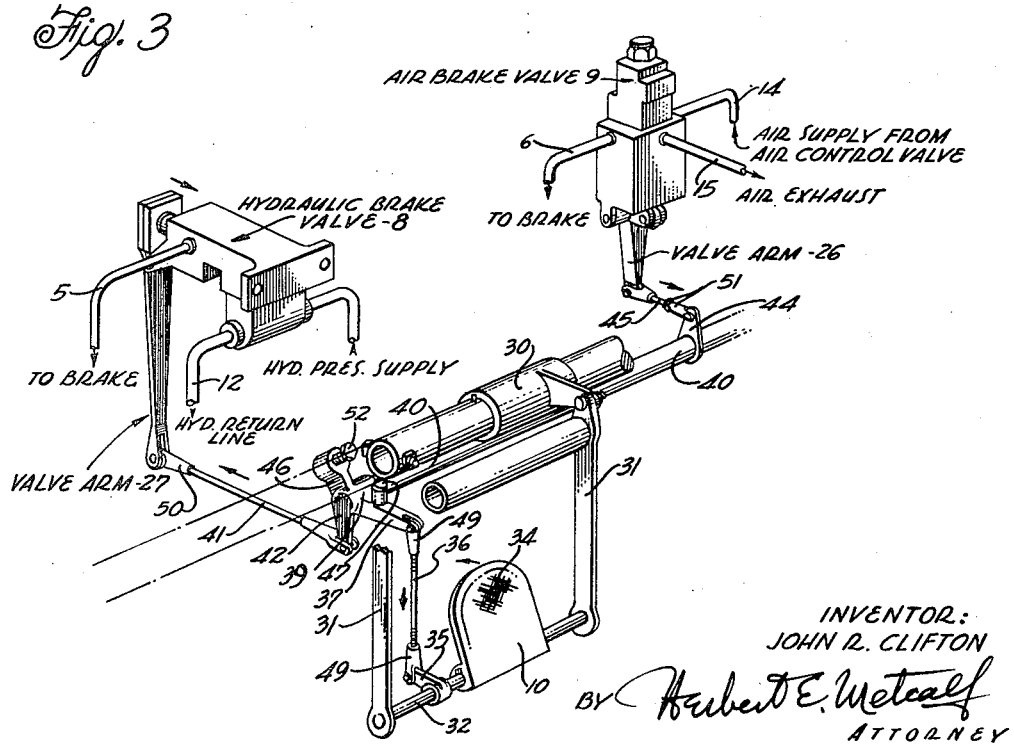
INVENTOR:
JOHN R. CLIFTON
BY Herbert E. Metcalf
ATTORNEY Patented Oct. 26, 1954

2,692,662

UNITED STATES PATENT OFFICE 2,692,662

EMERGENCY BRAKE SYSTEM FOR AIRCRAFT

John R. Clifton, Los Angeles, Calif., assignor to Northrop Aircraft, Inc., Hawthorne, Calif., a corporation of California Application November 19, 1949, Serial No. 128,384

6 Claims. (Cl. 188—152)

1

This invention relates to wheel brake systems, and more particularly, to a wheel brake system for aircraft wherein the emergency brakes are applied by the pilot through the same controls and with the same valving effects as in the main brake system.

In airplane having hydraulic braking systems for the landing gear wheels, it is common practice to provide an emergency source of fluid pressure connectible to operate the main wheel brakes in case of failure of the primary brake system, and this emergency source is frequently compressed air. The main system brakes are operated by brake pedals associated with the rudder pedals, and heretofore, the emergency brakes have been operated by separately located control means, such as valve levers, for example, mounted in the cockpit for manipulation by the pilot's hand. Since each of the two main wheels of the aircraft have an independently controlled brake, two brake pedals and two emergency hand levers have customarily been provided, one of each for each wheel brake.

When using the emergency brake system, therefore, it has been necessary for the pilot to keep one hand continually holding the emergency brake levers, thus leaving only the other hand to control the airplane. However, during the crucial period of bringing the airplane to a safe taxiing speed, and then to a stop, the pilot might well have other uses for one hand, and is not likely to be adept at braking by hand, because of the infrequent occurrence of this emergency procedure.

It is an object of the present invention to provide an emergency braking system which is operable by the usual primary system brake pedals, thus leaving both the pilot's hands free for other operations and allowing emergency braking by the usual pilot movements involved in the use of the normal system.

Another object of the invention is to provide an emergency braking system which is normally inoperative for braking purposes, but which can be quickly brought into proper operation regardless of the position of the brake pedals which were controlling the primary brake system.

Briefly, my invention comprises two brake valves operated in parallel with each brake pedal, one connected in the main brake system to energize the brake when operated and the other connected in the emergency system but normally ineffective because of no pressurized fluid being supplied to it. An emergency control

2 valve is provided to energize this second valve when the main system fails, a brake line proceeding from each brake valve to a shuttle valve mounted at the brake, this shuttle valve also being connected to the brake pedal valve of the primary system.

This invention will be more completely understood by reference to the accompanying drawings illustrating one preferred embodiment to be described herein.

In the drawings:

Figure 2 is a schematic diagram showing complete fluid connections of the system of Figure 1.

Figure 3 is a perspective view showing mechanical connections between one brake pedal and a hydraulic brake valve and an emergency air brake valve.

Figure 1:
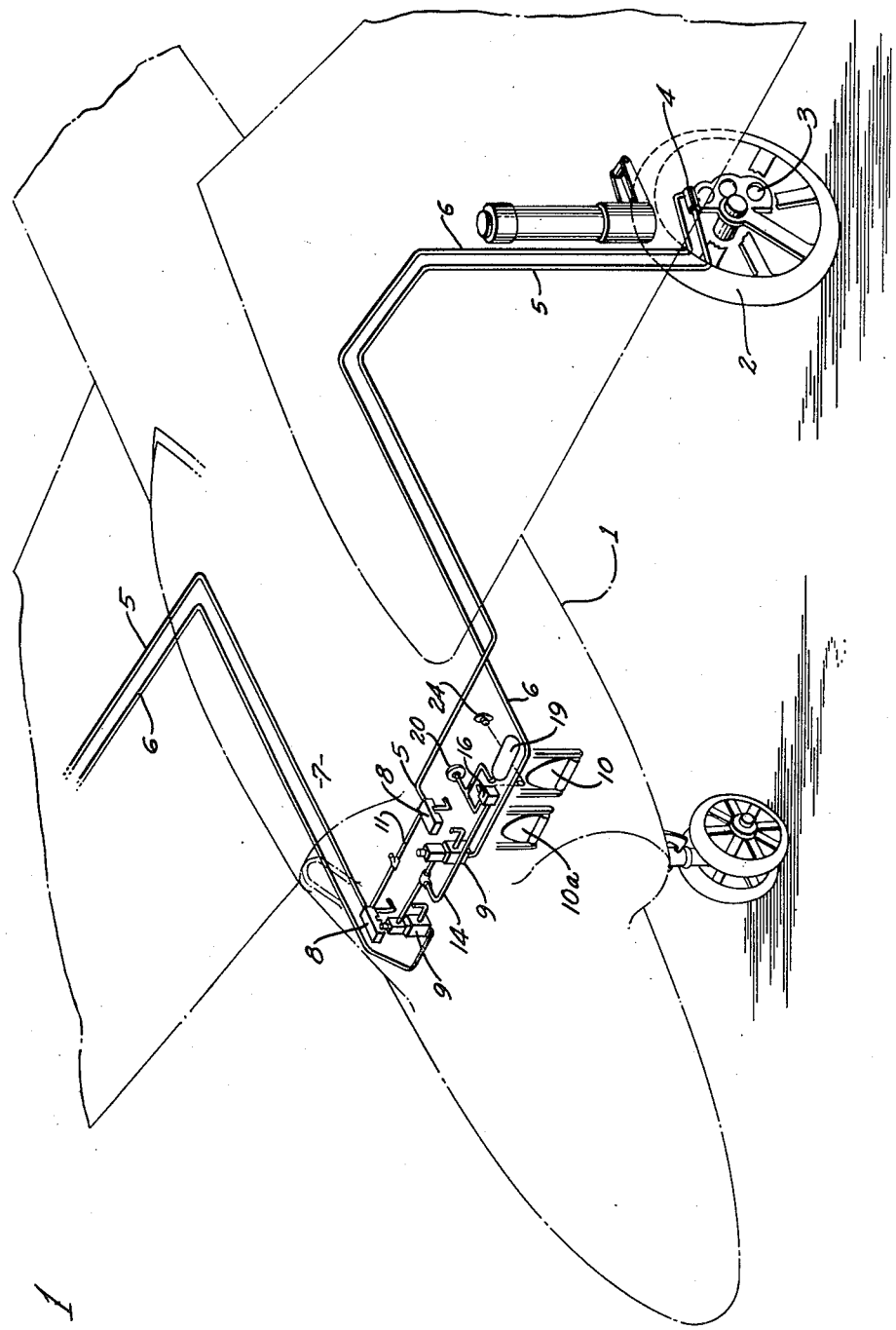
Figure 1 is a perspective view of an airplane showing the general arrangement of the brake system and the components of the present emergency brake system.

Referring first to Figure 1, an airplane 1 having two main landing gear assemblies 2 is equipped with a hydraulic brake assembly 3 on each main gear 2. Fluid under pressure is supplied to each brake 3 through a brake shuttle valve 4, which connects with two inlet lines: a hydraulic brake line 5 and an air brake line 6. The shuttle valve 4 functions to admit fluid to the brake 3 from whichever line is pressurized, and simultaneously blocks off the other line, as is well known in the art.

The two brake lines 5 and 6 lead to the airplane cockpit 7 where they connect to a hydraulic power brake valve 8 and an emergency air brake valve 9 respectively. These two valves 8 and 9 control the brake on the one main gear and are operated simultaneously by one brake pedal 10. Two identical valves control the other main gear brake (not shown) and are similarly operated by another brake pedal 10a, the pedals also operating as rudder control pedals in the conventional manner.

Hydraulic and air line connections are shown in Figure 2. Each hydraulic brake valve 8 connects to a fluid pressure inlet line 11 and a return line 12 in addition to the hydraulic brake line 5. The fluid pressure inlet line 11 is supplied from the airplane's hydraulic power system (not shown). Each air brake valve 9 connects to an air supply line 14 and an exhaust line 15 in addition to the air brake line 6.

The air supply line 14 leads to the outlet of an air control valve 16, normally closed, which is connected at its inlet with an air pressure line 17 leading to an air cylinder 19. A pressure gage 20 is preferably provided and connected into the air pressure line 17 to indicate the amount of pressure in the cylinder 19 and up to the air control valve 16, and a filler valve 18 is provided in the cylinder line to charge the system. A spring-loaded control arm 21 is moved from the closed position to the open position, when desired, by any means convenient to the pilot, such as a cable 22 attached to a pull handle 24, for example, and including stop means 25 for holding the valve open. With the air control valve 16 open, air pressure from the supply cylinder 19 exists up to the air brake valves 9, and the latter are then ready for action.

The brake valves 8 and 9 are operated respectively by an air brake valve arm 26 and a hydraulic brake valve arm 27, these units being further shown in Figure 3. Each valve (air or hydraulic) is a spring-loaded metering valve which is normally closed, and, when operated by its respective arm, supplies fluid to the brake lines at a pressure dependent on the displacement of the valve arm. Upon closing of the valve again, pressure in the brake and brake lines is dissipated into the return or exhaust lines. Since the action and use of this type valve is well known, their detailed description will not be included, it being understood that satisfactory valves are obtainable for this purpose.

In Figure 3 are shown the mechanical connections between one brake pedal 10 and the valve arms for the control of one brake. Operation of the other brake by the second pedal is exactly the same. Here, a lateral rudder tube 30 supports pedal hangers 31 from which swing the rudder and brake pedal 10 keyed to a pedal shaft 32. The toe 34 of the brake pedal 10, when pushed forward and down, does not move the pedal hangers 31 but does actuate a pedal arm 35 also attached securely to the shaft 32 to rotate the arm 35 about the shaft center line. A brake actuating rod 36 is pivotally connected to the end of the pedal arm 35 and extends upwardly substantially parallel to the pedal hangers 31 to pivotally connect with a first leg 37 of a crank 39 fixed to a torque shaft 40 to rotate therewith. A hydraulic valve link 41 connects between a second leg 42 of the crank 39 and the hydraulic brake valve arm 27 to push the latter arm when the brake pedal 10 is depressed, and thus actuate the valve.

Also attached to the torque shaft 40 is a lever 44 connecting through an air valve link 45 to the air brake valve arm 26. The air brake valve arm is pulled when the brake pedal 10 is depressed, thus actuating the air brake valve 9 simultaneously with the hydraulic brake valve 8.

A third leg 46, also movable with torque shaft 40, carries a fixed stop 47 which contacts the rudder tube 30 to determine the "brake off" position of the system, and the actuating rod 36 carries adjustable length fittings 49 for setting the brake pedal 10 to any desired neutral position. Link adjustments 50 and 51 provide proper connections to the valves so that neutral of the pedal and linkage will correspond to neutral of the valve arms. Pedal travel is regulated by an adjustable stop 52 contacting the rudder tube 30 in the maximum "brake on" position to provide the desired brake pressure.

In normal operation, the hydraulic brake valve 8 is in control of the brake, with the air brake valve 9 merely "free wheeling" as the pedal is moved, because no air pressure is fed to it, the air cylinder 19 being charged and held in reserve by the closed air control valve 16. If the hydraulic brake lines are broken or fluid pressure fails, the pilot can open the air control valve 16 by the pull handle 24 and operate the brake pedals as usual. In this event, the shuttle valves 4 are moved by the air pressure to block off the hydraulic brake lines 5 and allow air as metered by the air brake valves 9 to enter and operate the brakes 3.

It is thus seen that the pilot has both hands free of any brake control after the momentary operation of opening the air control valve 16. Emergency brake operation is then performed in the habitual manner with the same brake pedals as during braking with the normal hydraulic system. The capacity of the air cylinder 19 and its pressure are predetermined to allow an ample air supply for stopping the particular airplane for which it is intended. After one such use of the emergency air brake system, the cylinder is refilled and the air control valve is reset for future possible use when the airplane is flown again with the hydraulic brake system having been repaired and the air bled from the brakes.

It will be noted that since the air brake valves 9 are always being actuated along with the hydraulic brake valves 8, the emergency air brakes are always ready for operation when supplied with the compressed air. The composite system is initially rigged by means of the adjustments described before so that the emergency controls are immediately operable regardless of the position of the brake pedals when the emergency system is turned on.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An aircraft wheel brake system comprising a hydraulic brake connectable to brake the rotation of a wheel, a brake shuttle valve connected at its outlet to said brake and having two inlets, two separate and independent brake supply lines connected to said shuttle valve, said inlets being alternately open to one of said supply lines in accordance with the pressure differential between fluid in the respective lines, a hydraulic brake power valve having a control arm and connected to meter fluid pressure to one of said brake supply lines from a normal hydraulic power source in proportion to the setting of said control arm, an emergency brake power valve also having a control arm and connected to meter fluid pressure to the other of said brake supply lines from a separate emergency brake power source in proportion to the setting of its respective control arm when energized by said emergency source, means for so energizing said emergency brake valve at will, a brake control member, and a linkage connecting said two valve control arms in parallel with said control member whereby both of said valves are actuated simultaneously.

2. An aircraft wheel brake system comprising a hydraulic brake connectable to brake the rotation of a wheel, a brake shuttle valve connected at its outlet to said brake and having two inlets, two separate and independent brake supply lines connected to said shuttle valve, said inlets being alternately open to one of said supply lines in accordance with the pressure differential between fluid in the respective lines, a hydraulic brake power valve having a control arm and connected to meter fluid pressure to one of said brake supply lines from a normal hydraulic power source in accordance with the position of said control arm, an emergency brake power valve also having a control arm and connected to meter fluid pressure to the other of said brake supply lines from a separate emergency power source in accordance with the position of its respective control arm, a normally closed control valve connected between said emergency power source and said emergency brake valve, a brake control member, and a linkage connecting said valve control arms in parallel with said control member to actuate both of said valves simultaneously.

3. In an aircraft wheel brake system having a fluid pressure operated brake, the combination of controllable means for delivering operating pressure to said brake from a normal pressure source; a brake control member connected to said normal delivery means to regulate said operating pressure between zero and maximum; controllable emergency means independent of said first mentioned means for delivering operating pressure to said brake from a separate emergency pressure source, and a connection between said brake control member and said emergency delivery means for controlling the latter by ordinary movement of said control member to regulate the brake operating pressure supplied by said emergency delivery means.

4. In an aircraft wheel brake system having a fluid pressure operated brake, the combination of controllable means for delivering operating pressure to said brake from a normal pressure source; a brake control member connected to said normal delivery means to regulate said operating pressure between zero and maximum; normally de-energized controllable means independent of said first mentioned means, for delivering operating pressure to said brake from a separate emergency perssure source, means to connect said emergency delivery means to said control member for simultaneous control with said normal delivery means, and means for energizing said emergency delivery means at will.

5. Apparatus in accordance with claim 3 wherein said connection includes adjustable means for coinciding the zero operating pressure position of said emergency delivery means with said zero operating pressure position of said normal delivery means.

6. The structure defined in claim 4, in which the brake control member is a pedal and the connecting means is a linkage.

References Cited in the file of this patent

UNITED STATES PATENTS

| Number | Name | Date |
|---|---|---|
| 2,209,343 | Masteller | July 30, 1940 |
| 2,300,694 | Overbeke | Nov. 3, 1942 |
| 2,366,310 | Boldt | Jan. 2, 1945 |
| 2,394,343 | Vorech | Feb. 5, 1946 |
| 2,409,335 | Von Stackelberg | Oct. 15, 1946 |
| 2,502,152 | Hudson | Mar. 28, 1950 |